United States Patent
Parisi

(10) Patent No.: US 9,908,085 B2
(45) Date of Patent: Mar. 6, 2018

(54) METHOD FOR REMOVING HEAT STABLE BASE SALTS FROM A CONTAMINATED BASIC SOLUTION, AND USE THEREOF IN A PROCESS FOR RECOVERING ACID GAS FROM AN ACID GAS STREAM

(75) Inventor: Paul Parisi, Saint-Lambert (CA)

(73) Assignee: Electrosep Technologies, Inc., Saint-Lambert (CA)

(*) Notice: Subject to any disclaimer, the term of this patent is extended or adjusted under 35 U.S.C. 154(b) by 517 days.

(21) Appl. No.: 13/981,459

(22) PCT Filed: Jan. 24, 2012

(86) PCT No.: PCT/CA2012/000065
§ 371 (c)(1),
(2), (4) Date: Jul. 24, 2013

(87) PCT Pub. No.: WO2012/100330
PCT Pub. Date: Aug. 2, 2012

(65) Prior Publication Data
US 2013/0309155 A1 Nov. 21, 2013

Related U.S. Application Data

(60) Provisional application No. 61/435,629, filed on Jan. 24, 2011.

(51) Int. Cl.
*B01D 53/14* (2006.01)
*B01D 53/96* (2006.01)
*B01D 53/62* (2006.01)

(52) U.S. Cl.
CPC ......... *B01D 53/96* (2013.01); *B01D 53/1425* (2013.01); *B01D 53/1456* (2013.01);
(Continued)

(58) Field of Classification Search
None
See application file for complete search history.

(56) References Cited

U.S. PATENT DOCUMENTS 2,768,945 A 10/1956 Shapiro
3,554,690 A * 1/1971 Maryland et al. . B01D 53/1425
423/229

(Continued)

FOREIGN PATENT DOCUMENTS

EP 0286143 A1 10/1988
EP 0602675 A1 6/1994
(Continued)

OTHER PUBLICATIONS

PCT International Search Report for PCT/CA2012/000065, dated Mar. 20, 2012.
Heat Stable Salt Management, DOW, Jul. 2004, 4 pgs.

*Primary Examiner* — Anita Nassiri Motlagh
(74) *Attorney, Agent, or Firm* — Dority & Manning, PA

(57) ABSTRACT

A method for removing heat stable base salts, such as amine salts, is disclosed. The method of the present invention can be used to reduce the level of heat stable salts in a solvent gas stream in an acid gas removal process. A solvent in which the lean acid gas loading is high is first stripped to achieve an acceptable lean gas loading. The lean solution is then reclaimed using one or more methods. The purified base or amine solution can be used again to remove acid gases from a gas stream. A process for recovering acid gas from an acid gas stream is also disclosed. The process also comprises a reduction of the level of heat stable salts in the solvent gas stream.

24 Claims, 2 Drawing Sheets

(52) U.S. Cl.
CPC ........ *B01D 53/62* (2013.01); *B01D 2252/103* (2013.01); *B01D 2252/204* (2013.01); *B01D 2257/504* (2013.01)

(56) References Cited

U.S. PATENT DOCUMENTS

| | | | |
|---|---|---|---|
| 4,208,395 | A | 6/1980 | Gorin |
| 4,245,569 | A | 1/1981 | Fallon, III |
| 4,906,387 | A | 3/1990 | Pisani |
| 5,292,407 | A * | 3/1994 | Roy .................. B01D 53/1425 205/431 |
| 5,338,521 | A * | 8/1994 | Quinn .................. C01B 17/167 423/210.5 |
| 5,601,784 | A | 2/1997 | Glover et al. |
| 5,910,611 | A | 6/1999 | Gregory, Jr. et al. |
| 6,187,277 | B1 | 2/2001 | Kirschner |
| 8,226,893 | B2 | 7/2012 | McLauchlan et al. |
| 2002/0020625 | A1 | 2/2002 | Byszewski |
| 2007/0148068 | A1 | 6/2007 | Burgers et al. |
| 2008/0159937 | A1* | 7/2008 | Ouimet .............. B01D 53/1475 423/230 |
| 2010/0074828 | A1 | 3/2010 | Singh |

FOREIGN PATENT DOCUMENTS

| | | |
|---|---|---|
| EP | 0810904 B1 | 12/1997 |
| EP | 1216744 A1 | 6/2002 |
| WO | 9626007 A1 | 8/1996 |
| WO | 2010142716 A1 | 12/2010 |

* cited by examiner

METHOD FOR REMOVING HEAT STABLE BASE SALTS FROM A CONTAMINATED BASIC SOLUTION, AND USE THEREOF IN A PROCESS FOR RECOVERING ACID GAS FROM AN ACID GAS STREAM

FIELD OF THE INVENTION

The present invention relates to the removal of heat stable base salts from liquid streams. More specifically, the present invention relates to a method for converting a lean, semi-lean or rich amine stream to a lean or leaner amine stream, and removing the heat stable amine salt from the lean solution. The present invention also relates to the use of this removing method in a process for recovering acid gas from an acid gas stream.

BACKGROUND OF THE INVENTION

A wide variety of absorption processes have been proposed for removing acid gases such as, for example, carbon dioxide, hydrogen sulphide, sulphur dioxide, sulphur trioxide, carbon disulphide, hydrogen cyanide, carbonyl sulphide and others from process gas streams using absorbents comprising amines.

Such absorption processes typically involve passing the process gas stream containing one or more of the acid gases to an absorption zone wherein it is contacted with a lean solvent comprising an absorbent such as a basic solution. A product gas stream, depleted in the acid gases relative to the process gas stream, is withdrawn from the absorption zone as a product. A rich solvent stream comprising the absorbent and the absorbed acid gases is also withdrawn from the absorption zone and passed to a regeneration zone, e.g. a stripping column, wherein the absorbed acid gases are desorbed from the solvent to provide a tail gas stream comprising the acid gases and the lean solvent stream herein before described.

A common problem in such acid gas absorption processes is that heat stable salts of the base are often formed during one or both of the absorption and regeneration steps as a by-product. Heat stable salts can be formed, for example, when strong acids such as hydrochloric acid or sulphuric acid are present in the process gas.

Heat stable salts can also be formed when sulphite anions are oxidised to sulphate anions in $SO_2$ amine recovery processes. Typical ions which form heat stable salts, i.e., heat stable anions, include, for example, sulphate anions, thiosulphate anions, polythionate anions, thiocyanate anions, acetate anions, formate anions, nitrate anions, chloride anions, oxylate ions and in addition for amines suitable for $H_2S$ and $CO_2$ scrubbing, sulphite anions. Heat stable salts generally do not have absorption capacity for the acid gases and are not regenerable under the conditions of the process. Therefore, the level of heat stable salts needs to be controlled in order to retain an adequate degree of absorption capacity for the acid gases.

Electrodialysis has been proposed as a method for removing heat stable salts from base containing streams such as amine containing streams. In a typical electrodialysis process (see for example U.S. Pat. No. 5,910,611) caustic, e.g., sodium hydroxide, is added to the stream containing the heat stable amine salt in order to dissociate the heat stable anion from the heat stable salt and provide an amine in free base form and a simple heat stable salt, e.g., sodium sulphate. The simple salt is then separated by conventional electrodialysis wherein the charged ions permeate through anion- and cation-selective membranes. The amine, which is non-ionic, does not permeate through the membranes and is discharged from the electrodialysis zone as a product.

An alternative electrodialysis process (U.S. Pat. No. 6,517,700) achieves the removal of the heat stable anion by neutralizing the anion directly with a base in a modified electrodialysis zone. In this process, amine losses are significantly reduced. No base is added directly into the amine solution. The waste stream is composed of the neutralized anions removed from the amine stream as in the process described by U.S. Pat. No. 5,910,611.

An ion exchange process (U.S. Pat. No. 4,970,344) achieves the removal of heat stable anions by the use of suitable ion exchange resins and the use of one or both of basic and acidic solutions to regenerate the ion exchange resins.

Alternatively, thermal heat stable amine salt reclamation methods can be utilized, see for example, Kohl & Nielson "Gas Purification" fifth edition, Gulf Publishing, Houston Tex., 1997.

For all of these methods, the presence of regenerable anions in the amine stream leads to process inefficiencies, reduced throughput and increased costs. Larger sized reclamation units are needed to overcome these inefficiencies. Since the regenerable anions will behave in a similar manner to the non-regenerable anions in ionic processes, increased membrane surface area or ion exchange resin volume will be required. Increased quantities of neutralization chemicals and electric power and/or regeneration chemicals will also be required. For thermal processes increased neutralization chemicals will be required.

For all of these methods, the quantity of waste generated increases with the quantity and concentration of non-regenerable anions in the solution being treated. Typically higher waste volumes will result in proportionally greater amine losses.

Primary and secondary amine amines can form carbamates when reacted with $CO_2$ as described in reaction 1 below for the case of a secondary amine.

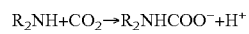

$$R_2NH + CO_2 \rightarrow R_2NHCOO^- + H^+$$

The resultant carbamate is ionic and will be removed with other heat stable and non-heat stable anions in ionic (electrodialysis and ion exchange) reclamation processes, resulting in an increase in amine losses.

Thus ensuring that the amine being treated is as lean as possible especially with respect to its lean $CO_2$ loading is imperative in order to reduce amine losses and maximize removal efficiency and capacity.

In certain scrubbing applications there is little need to achieve low acid gas concentrations in the treated gas. An example of this is carbon capture from flue gases, where 90% overall acid gas recovery is acceptable. Treated gas $CO_2$ concentrations may thus be greater than 1%. Such high concentration treated gas does not necessitate a high degree of leanness in the lean amine feed to the absorption tower.

SUMMARY OF THE INVENTION

The present invention first concerns a method for removing heat-stable base salts from a contaminated aqueous basic solution, the solution comprising at least one base in salt form having heat stable anions associated therewith, the method comprising:
a) passing a feedstream comprising the contaminated aqueous amine solution to a regeneration zone for obtaining a regenerated lean solvent stream comprising the heat-stable base salts; and b) passing all or a portion of the regenerated lean solvent stream to an amine reclamation unit for producing a product stream comprising at least in part a base in free base form in which the level of the heat-stable base salts has been lowered by the amine reclamation unit.

Preferably, the feedstream in step (a) comprises at least one portion of a rich or lean base stream, in a base acid gas recovery process. Therefore in step a), a tail gas stream comprising acid gases may be also obtained and the product stream produced in step b) may be used as an absorbent in the base acid gas recovery process.

Preferably, in step (a), the at least one base of the feedstream comprises amines, amides, other organic and/or inorganic bases allowing regenerable absorption and desorption of acid gases, or mixture thereof. The feedstream may also comprise water and amine(s) in free base form.

Preferably, the feedstream before the regenaration zone has a base acid gas loading of greater than 10,000 ppm, more preferably greater than 1,000 ppm. The lean solvent stream being fed to the reclamation unit after the regenaration zone then has an base acid gas loading of less than 10,000 ppm, more preferably less than 1,000 ppm.

The invention also concerns the use of the method as defined herein for removing heat-stable base salts from a contaminated aqueous base solution, in a process for recovering acid gas from an acid gas stream.

The invention also concerns a process for recovering acid gas from an acid gas stream, the process comprising the steps of:

a) passing an acid gas stream to an absorption zone wherein the acid gas stream is in contact with a lean solvent comprising at least one base which is an absorbent of acid gases;

b) withdrawing from the absorption zone a product gas stream depleted in acid gases relatively to the gas stream;

c) withdrawing from the absorption zone a rich solvent stream comprising the absorbent and absorbed acid gases;

d) passing the rich solvent stream to a first regeneration zone wherein:
  absorbed acid gases are desorbed from the rich solvent stream to provide a first tail gas stream comprising acid gases, and
  a first lean solvent stream is formed, the first lean solvent stream comprising base(s) in salt form having heat stable anions associated therewith;

e) passing the first lean solvent stream withdrawn from the regeneration zone to the absorption zone of step (a) for further treatment in a loop process;

f) partially withdrawing an amount of the first lean solvent stream before the absorption zone;

g) passing the amount of the first lean solvent stream to a second regeneration zone wherein;
  all or a portion of remaining absorbed acid gases that were not desorbed in step d) are desorbed from the amount of the first lean solvent stream to provide a second tail gas stream comprising acid gases, and
  a second lean solvent stream is formed, the second lean solvent stream also comprising base(s) in salt form having heat stable anions associated therewith;

h) passing the second lean solvent stream to a reclamation unit for producing an base stream comprising at least in part a base in free base form in which the level of said heat-stable base salts has been lowered by the reclamation unit; and i) passing the base stream to the absorption zone used in step (a) for reacting with the process acid gas stream in a loop process.

Preferably, the at least one base comprises amine(s), amide(s), other organic and/or inorganic bases allowing regenerable absorption and desorption of acid gases, or mixture thereof. The first and second lean solvent streams may also comprise water and amine(s) in free base form.

Preferably, the first and second tail gas streams comprising acid gases are combined.

In the method and process described herein, the regeneration zone(s) are preferably a stripping column and the reclamation unit may be an electrodialysis unit, a distillation unit or an ion exchange unit.

In the method and process described herein, the amines may be monoethanolamine, methyldiethanolamine, diethanolamine, aminoethoxyethanol, diisopropyl amine or mixture thereof. Other amines or amides known in the art as an absorbent of acid gases can be used.

The regeneration zone can be a stripping column or any other conventional method of stripping basic solutions containing acid gases, such as flash regeneration, etc.

Advantageously, in the above method and process, the feedstream going to the reclamation unit is further regenerated, preferably stripped, in an additional regeneration zone giving a regenerable acid gas and a leaner stream which is injected into the reclamation unit wherein a base stream having a higher content of base in a free form is produced. The base stream can then be reused in the process recovering gas. It is therefore possible to maintain the level of heat stable salts in the lean solvent feed to the absorption zone of an acid gas absorption process at a level low enough to not substantially interfere with the absorption of the acid gas.

DESCRIPTION OF EMBODIMENTS OF THE INVENTION

Figure 1:
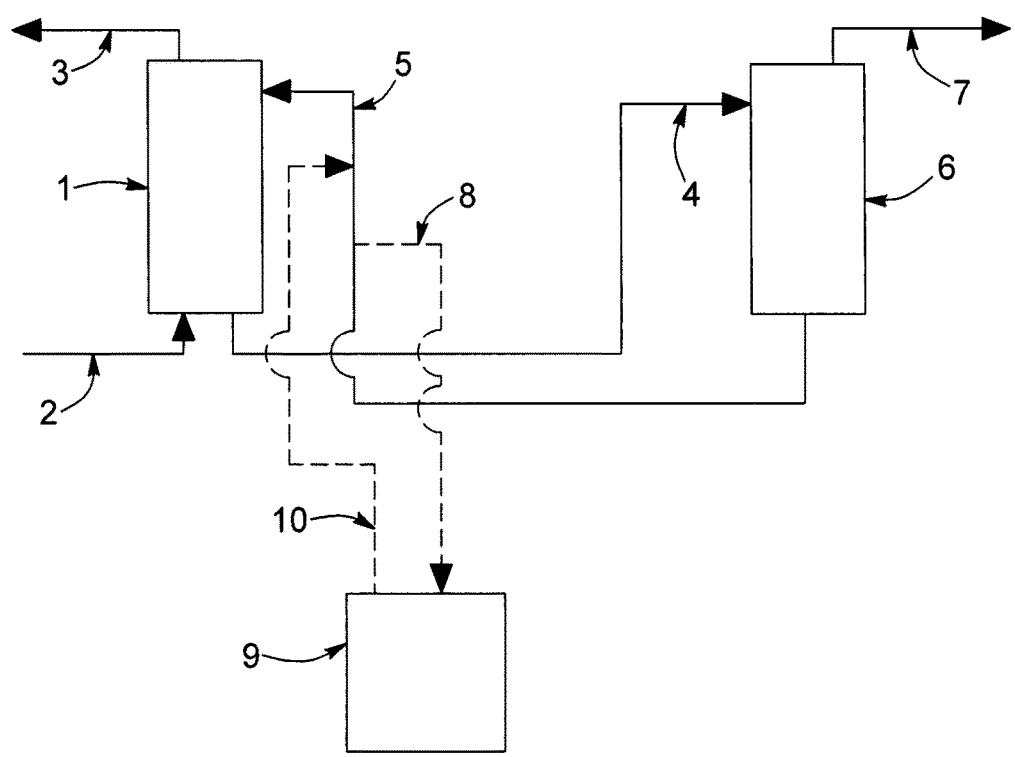
FIG. 1 is a flow diagram illustrating a known process in which a reclamation unit is utilized in the context of a gas treating process to remove heat stable salts.

Feedstreams suitable for use in accordance with the present invention generally include any liquid stream comprising an amine in a salt form having heat stable anions associated therewith. Typically, the feedstreams are aqueous and also comprise at least in part an amine in free base form. The concentration of the heat stable salts is typically from about 0.1 to 25 weight percent (wt. %) based on the total feedstream.

By the term "about" used herein in the present application, it has to be understood that the measures indicated in the present application have a precision which cannot be inferior to the precision of the apparatus used to get this measure. It is commonly accepted that a 10% precision measure encompasses the term "about".

In hydrogen sulfide and carbon dioxide acid gas absorption processes, the concentration of heat stable amine salts is often from about 1 to 5 wt. %. In sulfur dioxide acid gas absorption processes, the concentration of heat stable amine salts is often from about 1 to 15 wt. %.

The concentration of amine in free base form is typically from about 5 to 60 wt. %, more typically from 20 to 50 wt. %. The concentration of water, when present, typically comprises the balance of the feedstream, and is preferably, from about 30 to 95 wt. %, and more preferably from about 40 to 70 wt. %, based on the total feedstream.

It is not uncommon for the feedstreams to comprise small amounts, e.g., less than about 2 wt. %, of other ingredients such as, for examples, antifoams or antioxidants.

The source of the feedstream is typically from the solvent circulation loop of an acid gas absorption process. Often, the feedstream comprises a slipstream of the lean solvent stream, i.e. regenerated solvent, from the steam-stripping column, of an acid gas absorption process, such as described herein. However it is to be understood that the source of the feedstream is not a critical aspect of the present invention. In addition, the particular acid gas being absorbed in the acid gas absorption process is not a critical aspect of the present invention. Typical acid gases include hydrogen sulfide, carbon dioxide and sulfur dioxide. When hydrogen sulfide is present in the process gas stream, its concentration typically ranges from about 10 to 50,000 parts per million volume ("ppmv") or even up to 30 volume percent (vol. %) or more. When carbon dioxide is present in the process gas stream, its concentration typically ranges from about 2 to 30 vol. %, although levels of carbon dioxide as high as about 90 vol. % or more are not uncommon. When sulfur oxides are present in the gas stream, i.e. sulfur dioxide and/or sulfur trioxide, their total concentration typically ranges from about 500 ppmv to 50 vol. %, although levels as high as 70 vol. % or more are possible. The process gas streams typically comprise other ingredients such as, for example nitrogen, water, oxygen, light hydrocarbons, and sulfur derivatives of light hydrocarbons, e.g., mercaptans.

Suitable amines include, for example aliphatic, aromatic, heterocyclic amines and amides. Typical alkanol amines suitable for use in accordance with the present invention include for example monoethanolamine, diethanolamine, triethanolamine and methyldiethanolamine. Typical alkyleneamines include for example, ethylene diamine and alkyl derivatives thereof. Typical aromatic amines include, for example aniline and xylidine. Typical heterocyclic amines include, for example, piperazine and derivatives thereof. Typical amides include for example piperazinone. Known in the art of acid absorbent are monoethanolamine, methyldiethanolamine, diethanolamine, aminoethoxyethanol, diisopropyl amine or mixture thereof.

Heat stable salts often form during absorption or regeneration in acid gas absorption processes. As used herein, the term "heat stable salts" means any base or amine salt which cannot be regenerated under the regeneration conditions of the process or typical regeneration conditions. For example, typical conditions for regenerating the amine include steam stripping in a distillation column at a temperature of from about 75° C. to 160° C., and at a pressure of about 0.2 to 3 atmospheres. Heat stable salts are also known to those skilled in the art as those salts whose anions correspond to nonvolatile or strong acids relative to the strength of the acid gases being regenerably absorbed. Those skilled in the art can determine which anions can form heat stable salts depending on the particular amine and acid gas. Typical ions which form heat stable salts, i.e. heat stable anions, include for example, sulfate anions, nitrate anions, thiosulfate anions, thiocyanate anions, halide anions, nitrite anions, polythionate anions, acetate anions, formate anions, oxalate anions and mixtures thereof. Sulfite anions, which are heat regenerable anions, can be heat stable, for example, when present in a hydrogen sulfide or carbon dioxide absorption process.

In accordance with the present invention, it is possible to maintain the level of heat stable salts in the lean solvent feed to an absorption zone of an acid gas absorption process at a level low enough to not substantially interfere with the absorption of the acid gas.

When the absorbent comprises a monoamine, such as for the absorption of hydrogen sulfide and carbon dioxide or an amide for the absorption of sulfur dioxide, the level of heat stable salts in the regenerated absorbent is preferably less than about 0.25 equivalent of heat stable salt per mole of amine or amide, and more preferably less than about 0.1 equivalent per mole of amine.

When the absorbent comprises a diamine, such as for sulfur dioxide, the level of heat stable salts in the regenerated absorbent is typically less than about 1 equivalent of heat stable salt per mole of diamine, preferably less than about 0.8 equivalent per mole of diamine. For certain special applications, the level of heat stable salts is maintained in the range of 0.5 to 0.9 equivalents per mole or less (see U.S Pat. No. 5,019,361).

In the present invention when lean amine acid gas levels are too high, typically greater than 1,000 ppm, the lean amine slip-stream feed to the amine reclamation unit can be further stripped of acid gas in order to lower the acid gas concentration in the feed stream to the amine reclamation unit.

FIG. 1 illustrates a conventional amine acid gas recovery process with its associated amine reclamation unit. The reclamation unit can be operated continuously on site, or brought in from time to time on a need be basis.

For example, a process gas comprised of carbon dioxide, hydrochloric acid with the balance comprising water vapor, methane, ethane and nitrogen is introduced into the process via line 2 and passed into the absorption zone 1. In the absorption zone 1, the feed process stream is contacted with a lean solvent stream via line 5, the source of which is defined as being comprised of diethanolamine (or any other amine or amine mixture), with the balance being mostly water. Absorption in zone 1 is maintained at temperature of about 20° C. to 60° C., and a pressure of 1 to 150 atmospheres, and comprises a packed tower or spray scrubber, the details of which are known to those skilled in the art. Other types of absorption apparatus could be utilized, as it is not critical to the present invention. During absorption of the carbon dioxide, heat stable salts of amine, i.e. having chloride anions associated therewith, are formed.

A product gas stream at least partially depleted in carbon dioxide relative to the feed gas stream is discharged from absorption zone 1 via line 3.

A rich solvent stream comprising absorbed carbon dioxide and the amine is discharged from absorption zone 1 via line 4, and passed to a regeneration zone 6. During regeneration, carbon dioxide is liberated from the absorbent. Regeneration zone 6 may be a distillation column operated under steam stripping conditions at a temperature of about 75° C. to 150° C. and a pressure of 1 to 5 atmospheres, the details of which are known to those skilled in the art. The particular method and apparatus for regeneration is not critical to the present invention. It is common for heat stable salts to form in the regeneration zone as well.

A regeneration overhead stream comprising carbon dioxide and water is discharged from regeneration zone 6 via line 7. Regenerated amine or lean solvent is discharged from zone 6 via stream 5.

A slipstream is taken from the lean amine stream, line 5 and introduced via stream 8 into the amine reclamation device 9. The amine is returned to the process at least partially depleted in amine heat stable salts via line 10.

Figure 2:
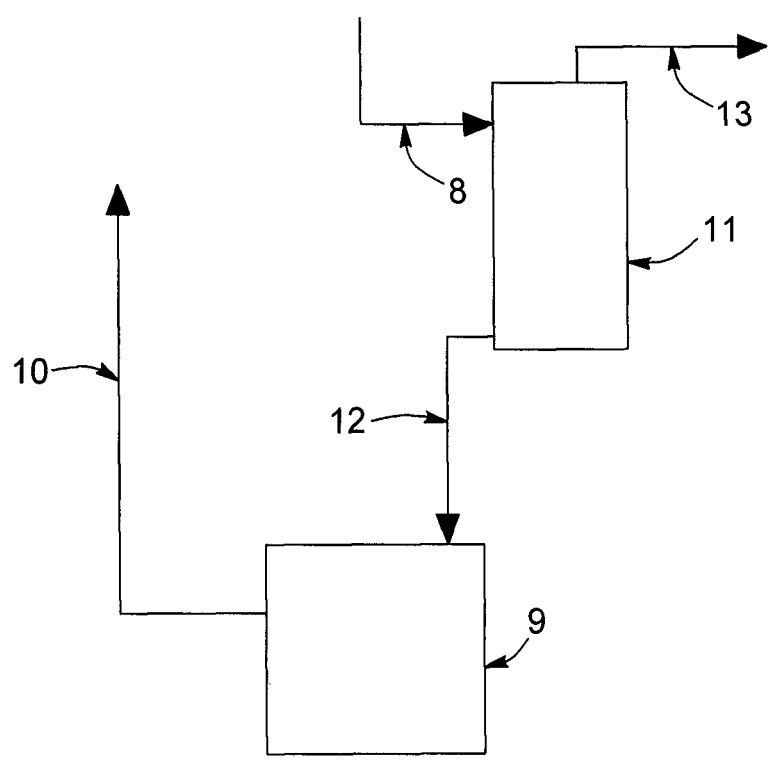
FIG. 2 is a partial flow diagram illustrating a process in accordance with a preferred embodiment of the present invention wherein the amine solution slip stream fed to the reclamation unit is stripped of acid gases before being fed to the amine reclamation unit.

In accordance with a preferred embodiment of the present invention illustrated in FIG. 2, the acid gas absorption and regeneration process comprises the process of FIG. 1 wherein a slipstream is taken from the lean amine stream, line 5, and introduced into a supplemental regeneration zone 11. During regeneration, carbon dioxide and other acid gases are liberated from the absorbent. Additional regeneration zone 11 may be a distillation column operated under steam stripping conditions at a temperature of 75° C. to 150° C. and a pressure of 1 to 5 atmospheres, the details of which are known to those skilled in the art. The particular method and apparatus for regeneration is not critical to the present invention.

A regeneration overhead stream comprising carbon dioxide, other acid gases and water is discharged from regeneration zone 11 via line 13 and can be combined with the discharge from regeneration zone 6 acid gas stream 7. Regenerated amine or lean solvent is discharged from zone 11 via stream 12, which is at least in part then fed to the amine reclamation unit 9. The amine is returned to the process at least partially depleted in amine heat stable salts via line 10.

All the methods known in the art can be used as a reclamation unit 9, for instance electrodialysis, ion exchange or distillation. Electrodialysis and ion exchange are preferably used for reclaiming secondary or tertiary amines, whereas distillation is preferably used for reclaiming primary amines. However, and as aforesaid, the particular method and apparatus for amine regeneration is not critical to the present invention.

EXAMPLE

A lean amine stream contains 5,000 ppm of heat stable anions and 25,000 ppm of lean acid gas, which shall be considered $CO_2$ for illustrative purposes. The lean amine is sent to an amine reclamation unit utilizing electrodialysis as the amine reclamation method. This example would be equally valid for other reclamation methods such as ion exchange and distillation.

The anions being removed must be neutralized. Assuming an average equivalent weight of 50 for the heat stable anions and 44 for $CO_2$ 100 gr of amine solution would contain 0.01 gr-equivalents of heat stable anions and 0.0568 gr-equivalents of $CO_2$. The total quantity of dissolved anions would be 0.0668 gr-equivalents. Assuming 80% removal of dissolved anions, would required 0.0534 (80% of 0.0668) gr-equivalents of neutralizing base such as caustic. 80% removal would reduce the heat stable anion concentration to approximately 1,000 ppm and the $CO_2$ concentration in the amine being returned from the reclamation unit to 5,000 ppm. Mobility (removal efficiency) of heat stable anions and $CO_2$ in this example is assumed to be equivalent. Net removal of heat stable anions would be 4,000 ppm or 0.4 gr per 100 gr of feed solution. Total removal required to achieve the 0.4 gr of heat stable anion removal would be 2.4 gr of which 2.0 gr would be $CO_2$ which could otherwise be removed using conventional thermal amine regeneration methods. Amine losses typically are directly proportional to overall anion removal rate. In addition amine carbamate (an anion formed by the reaction of $CO_2$ with primary or secondary amines) concentration are typically proportional to lean $CO_2$ concentrations and thus high amine carbamate losses would be expected.

As described in the invention the lean amine acid gas loading would first be reduced by passing the lean amine slip stream first through a regeneration step before being sent to the amine reclamation unit. In this example the lean amine stream contains 5,000 ppm of heat stable anions and 25,000 ppm of $CO_2$. The slip-stream is then sent to a regeneration zone in which the $CO_2$ concentration is reduced to 500 ppm. Assuming the same average equivalent weights as in the previous example the lean amine feed to the amine reclamation zone would contain 0.01 gr-equivalents of heat stable anions (as in the first case) and 0.0114 gr-equivalents of $CO_2$. Total dissolved anion concentration would be 0.0114 gr-equivalents. Assuming 80% removal of dissolved anions, would required 0.001 (80% of 0.0114) gr-equivalents of neutralizing base such as caustic. 80% removal would reduce the heat stable anion concentration to 1,000 ppm and the $CO_2$ concentration to 100 ppm. Net removal of heat stable anions would be 4,000 ppm or 0.4 gr per 100 gr of feed solution. Total removal required to achieve the 0.4 gr of heat stable anion removal would be 0.44 gr of which 0.04 gr would be $CO_2$. Thus the objective of removing 0.4 gr of heat stable anions could be achieved in a reclamation unit with a capacity of 0.44 gr compared to a unit with a capacity of 2.4 gr. in the first example without the additional stripping zone as described in the invention or approximately 5.5 times smaller. Neutralization requirements would be reduced proportionally. Amine losses would be reduced by an even greater factor as a result of the reduced carbamate concentration if primary and/or secondary amine were present in the amine solution.

Of course, numerous modifications could be made to the embodiments above without departing from the scope of the present invention.

The invention claimed is:
1. A method for removing heat-stable base salts from a contaminated aqueous basic solution, the solution comprising at least one base in salt form having heat stable anions associated therewith, the method comprising:
   a) passing a feedstream comprising the contaminated aqueous basic solution to a supplemental regeneration zone for obtaining a regenerated lean solvent stream comprising the heat-stable base salts, the feedstream before the regeneration zone having a base acid gas loading of greater than 1,000 ppm, and
   b) passing all or a portion of the regenerated lean solvent stream to a reclamation unit for producing a product stream comprising at least in part a base in free base form in which the level of the heat-stable base salts has been lowered by the reclamation unit, wherein the reclamation unit comprises an electrodialysis unit, an ion exchange unit or a combination thereof;
   wherein the contaminated aqueous basic solution in step (a) comprises a slipstream from a primary regenerator that is part of an acid gas capture system, the acid gas capture system comprising an absorption unit receiving a gas stream comprising the acid gas and a lean solvent stream for absorbing the acid gas therefrom and producing a rich solvent stream that is supplied to the primary regenerator, and wherein the feedstream is provided in an amount for treatment in the reclamation unit to remove heat stable salts therefrom.

2. The method of claim 1, wherein in step a) a tail gas stream comprising acid gases is also obtained.

3. The method of claim 1, wherein the product stream produced in step b) is used as an absorbent in said base acid gas recovery process.

4. The method of claim 1, wherein in step (a), said at least one base of the feedstream comprises amines, amides, other organic and/or inorganic bases allowing regenerable absorption and desorption of acid gases, or mixture thereof.

5. The method of claim 4, wherein said amines are monoethanolamine, methyldiethanolamine, diethanolamine, aminoethoxyethanol, piperazine, diisopropyl amine or mixture thereof.

6. The method of claim 1, wherein the feedstream also comprises water and amine(s) in free base form.

7. The method of claim 1, wherein the regeneration zone is a stripping column.

8. The method of claim 1, wherein the reclamation unit is an electrodialysis unit or an ion exchange unit.

9. The method of claim 1, wherein the lean solvent stream after the regeneration zone and being fed to the reclamation unit, has a base acid gas loading of less than 1,000 ppm.

10. The method of claim 1, wherein the feedstream before the regeneration zone has a base acid gas loading of greater than 10,000 ppm.

11. The method of claim 1, wherein the lean solvent stream being fed to the reclamation unit after the regeneration zone has a base acid gas loading of less than 10,000 ppm.

12. A method for removing heat-stable amine salts from a contaminated aqueous amine solution from a regeneration zone, the regeneration zone receiving a rich amine solvent stream from a $CO_2$ absorption zone and comprising absorbed $CO_2$, the $CO_2$ absorption zone receiving $CO_2$-containing flue gas and a lean amine solvent stream for absorbing $CO_2$ from the flue gas, $CO_2$ gas being desorbed from the rich amine solvent stream in the regeneration zone, the contaminated aqueous amine solution comprising at least one amine compound, residual $CO_2$, and heat-stable amine salts, the method comprising:
  withdrawing a slipstream from the lean amine solvent stream to form the contaminated aqueous amine solution, wherein the slipstream is withdrawn in an amount for downstream reclamation to remove heat stable salts therefrom;
  subjecting the slipstream to additional $CO_2$ removal in a supplemental regeneration zone to produce a lean regenerated stream;
  subjecting the lean regenerated stream to reclamation in a reclamation unit to remove a portion of the heat stable amine salts and form a reclaimed amine stream; wherein the reclamation comprises electrodialysis, ion exchange, or a combination thereof; and
  returning the reclaimed amine stream to the $CO_2$ absorption zone.

13. The method of claim 12, wherein the supplemental regeneration zone is operated under stripping conditions for the additional $CO_2$ removal.

14. The method of claim 12, wherein the supplemental regeneration zone is operated conditions at a temperature of 75° C. to 150° C. and a pressure of 1 atmosphere to 5 atmospheres.

15. The method of claim 12, wherein the supplemental regeneration zone comprises a distillation column.

16. The method of claim 12, wherein the supplemental regeneration zone is operated at a pressure of about 0.2 atmosphere to 3 atmospheres.

17. The method of claim 12, wherein the lean regenerated stream has a temperature of 75° C. to 150° C.

18. The method of claim 12, wherein the reclamation comprises subjecting the lean regenerated stream to electrodialysis.

19. The method of claim 12, wherein the reclamation comprises subjecting the lean regenerated stream to ion exchange.

20. The method of claim 12, wherein the regeneration zone and the supplemental regeneration zone are operated at temperatures of 75° C. to 150° C., and the absorption zone is operated at a temperature of 20° C. to 60° C.

21. The method of claim 20, wherein the reclaimed amine stream is recycled directly to form part of the lean amine solvent stream that is supplied to the absorption zone.

22. The method of claim 12, wherein the at least one amine compound comprises monoethanolamine, methyldiethanolamine, diethanolamine, aminoethoxyethanol, diisopropyl amine or mixture thereof.

23. A method for removing heat-stable amine salts from a contaminated aqueous amine solution obtained from a primary regeneration unit that is part of a $CO_2$ capture system, the method comprising:
  providing a feedstream comprising a portion of the contaminated aqueous amine solution in an amount for downstream reclamation to remove heat stable salts therefrom:
  prior to the downstream reclamation, supplying the feedstream to a supplemental regeneration unit for removing residual $CO_2$ therefrom and producing a regenerated lean solvent stream comprising the heat-stable base salts;
  supplying at least a portion of the regenerated lean solvent stream to a reclamation unit for removing the heat-stable amine salts and producing a reclaimed solvent stream, the reclamation unit comprising electrodialysis, ion exchange, or a combination thereof; and
  recycling the reclaimed solvent stream back into the $CO_2$ capture system.

24. A method for treating a slipstream comprising heat-stable base salts obtained from a primary regeneration unit that is part of a $CO_2$ capture system, the method comprising:
  supplying the slipstream to a supplemental regeneration unit for removing residual $CO_2$ therefrom and producing a regenerated lean solvent stream comprising heat-stable base salts;
  supplying the regenerated lean solvent stream to a reclamation unit for removing the heat-stable amine salts and producing a reclaimed solvent stream, wherein the reclamation unit comprises an electrodialysis unit, an ion exchange unit or a combination thereof;
  recycling the reclaimed solvent stream back into the $CO_2$ capture system; and
  wherein the slipstream is withdrawn in an amount for downstream reclamation in the reclamation unit to remove heat stable salts therefrom, but the slipstream is supplied into the supplemental regeneration unit prior to the reclamation unit.

* * * * *